C. WILSON.
DEVICE FOR TIGHTENING ROPES ON COTTON BALES.
No. 31,505. Patented Feb. 19, 1861.
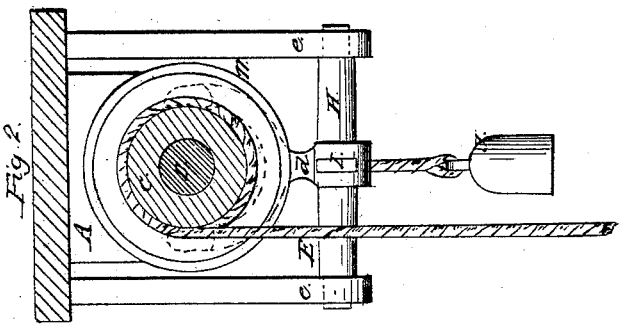
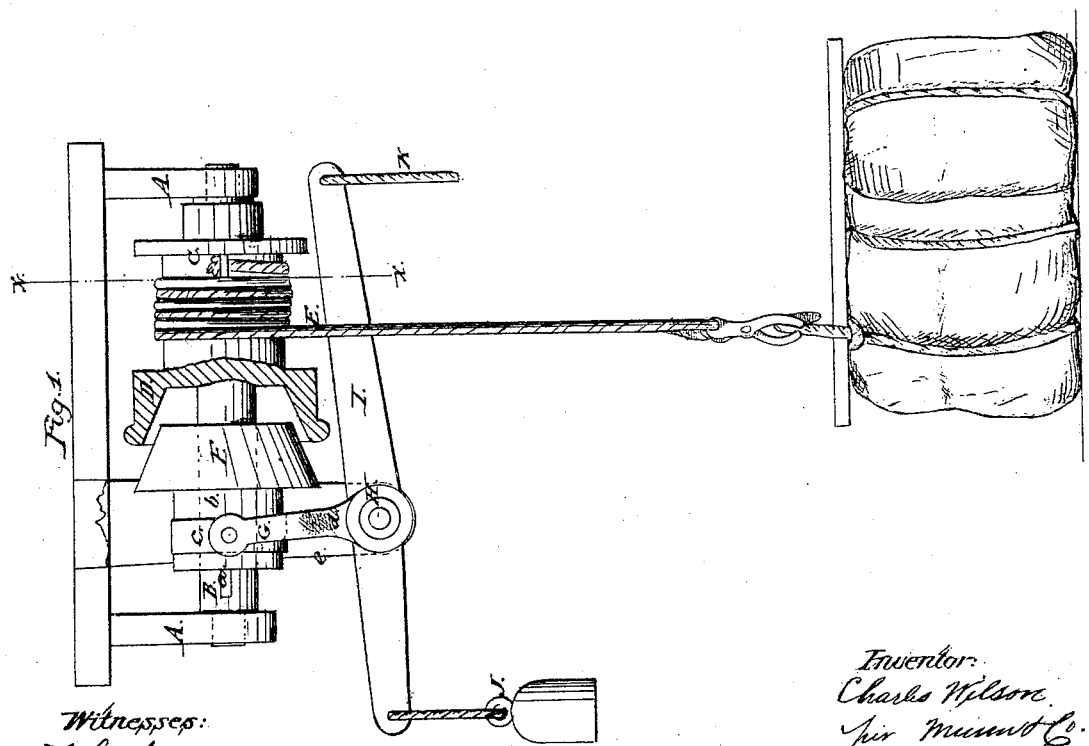

UNITED STATES PATENT OFFICE.

CHARLES WILSON, OF BROOKLYN, NEW YORK.

TIGHTENING ROPES ON COTTON-BALES.

Specification of Letters Patent No. 31,505, dated February 19, 1861.

*To all whom it may concern:*

Be it known that I, CHARLES WILSON, of Brooklyn, in the county of Kings and State of New York, have invented a new and Improved Device for Tightening Ropes on Cotton-Bales After the Latter are Compressed; and I do hereby declare that the following is a full, clear, and exact description of the same, reference being had to the annexed drawings, making a part of this specification, in which—

Figure 1 is a side view of my invention. Fig. 2, a transverse section of the same, taken in the line $x, x'$, Fig. 1.

Similar letters of reference indicate corresponding parts in the two figures.

The object of this invention is to obtain a machine which may be readily connected to the ropes of a cotton bale and power applied effectively for drawing tightly the ropes around the bale after it is compressed and before its removal from the press, the parts being so arranged that they will be under the complete control of the operator and the device rendered capable of being manipulated with the greatest facility.

To enable those skilled in the art to fully understand and construct my invention I will proceed to describe it.

A, A, represent two hangers or pendants which may be attached to any suitable framing above the press in which the bales are compressed, and B, is a shaft which has its bearings in the hangers A, A, and is allowed to turn freely therein, said shaft being rotated continuously during the baling operation by any convenient power. On the shaft B, there is placed loosely a collar C, one end D, of which is enlarged and made internally conical as shown clearly in Fig. 1. The collar C, has a rope E, attached to it, one or more, and on the shaft B, there is placed a sliding cone F, which cone is fitted on a feather $a$, on said shaft. The cone F, has a hub $b$, attached and this hub is grooved or recessed circumferentially to receive loosely a ring or band $c$. To the ring or band $c$, there is secured a fork G, which is provided with a tang or arm $d$. The lower end of this tang or arm is attached to to a shaft H, the journals of which are placed in pendants $e, e$. To the shaft H there is attached a lever I, one end of which has a weight J, attached, and the opposite end has a rope K, connected to it.

The operation is as follows: When the bale is compressed the rope E, on collar C, is connected to the rope on the bale by means of a gripping tongs or other suitable device, see Fig. 1, in which the bale is shown in blue, and the operator thereby drawing down the rope K, of the lever I, actuates said lever and forces the cone F, into the shell D, of the collar C, with sufficient power to connect the shell and cone by friction, the shell D, and collar C, being thereby made to rotate with the cone. The rope E, therefore, will be wound on the collar C, and the rope on the bale consequently tightened.

In practice it is designed to have a plurality of ropes E, attached to the collar C, the number of ropes E, corresponding to the number of ropes on the bale, so that all the ropes on the bale may be tightened at one operation. When the ropes are drawn tight around the bale they are secured or fastened in the usual or in any proper way.

Having thus described my invention what I claim as new and desire to secure by Letters Patent, is:

The arrangement of the windlass C and attached hollow cone D with the sliding cone F, weighted lever I, fork G, collar C and shaft B, in the manner and for the purposes herein shown and described.

CHARLES WILSON.

Witnesses:
W. ROSS POSTELL,
JOSEPH FELT.